US010392129B1

(12) United States Patent
Johannessen et al.

(10) Patent No.: US 10,392,129 B1
(45) Date of Patent: Aug. 27, 2019

(54) INTEGRATED MICRO-LED LUMINOUS AIRCRAFT PANEL

(71) Applicant: Rockwell Collins, Inc., Cedar Rapids, IA (US)

(72) Inventors: Eric Johannessen, Holbrook, NY (US); Matthew Dunn, Stony Brook, NY (US); Alvin S. Bartolome, Eastvale, CA (US); Arthur Loic Dibeton Tchakounte, Covina, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/030,560

(22) Filed: Jul. 9, 2018

Related U.S. Application Data

(63) Continuation-in-part of application No. 15/950,032, filed on Apr. 10, 2018, now abandoned.

(51) Int. Cl.
| | |
|---|---|
| *B64D 47/00* | (2006.01) |
| *B64D 47/02* | (2006.01) |
| *G09F 13/10* | (2006.01) |
| *G09F 13/22* | (2006.01) |
| *B64D 11/00* | (2006.01) |
| *F21K 9/20* | (2016.01) |

(52) U.S. Cl.
CPC .............. *B64D 47/02* (2013.01); *B64D 11/00* (2013.01); *F21K 9/20* (2016.08); *G09F 13/10* (2013.01); *G09F 13/22* (2013.01); *B64D 2011/0038* (2013.01); *B64D 2203/00* (2013.01); *G09F 2013/222* (2013.01); *G09F 2013/227* (2013.01)

(58) Field of Classification Search
CPC ......... G02F 1/133305; G02F 1/133308; G02F 2001/133311–133337; B64D 47/02; B64D 2011/0038
USPC ....................................................... 362/471
See application file for complete search history.

(56) References Cited

U.S. PATENT DOCUMENTS

| | | | |
|---|---|---|---|
| 9,725,033 B1 | 8/2017 | Johannessen | |
| 9,791,694 B1 * | 10/2017 | Haverkamp | G02B 27/01 |
| 2013/0161971 A1 * | 6/2013 | Bugno | B60J 3/04 |
| | | | 296/97.2 |
| 2013/0278624 A1 * | 10/2013 | Abe | G09G 5/363 |
| | | | 345/619 |

(Continued)

*Primary Examiner* — Gerald J Sufleta, II
(74) *Attorney, Agent, or Firm* — Angel N. Gerdzhikov; Donna P. Suchy; Daniel M. Barbieri

(57) ABSTRACT

An integrated aircraft lighting and display panel includes high-density arrays of micro-scale light-emitting diodes (LED) set into a flexible printed circuit board (PCB). The PCB and LED arrays may be set into structural layers corresponding to overhead panels, side panels, bin panels, divider panels, doorway panels, or other interior structural panels of the aircraft. The LED arrays may be activated by a controller to provide cabin lighting, indicate aircraft signage, display high-resolution image or video graphics, or any simultaneous combination of all three. The panel may have a translucent or transparent decorative outer skin which may mimic the outward appearance of wood, stone, bamboo, or other decorative materials while the integrated lighting and display panels are inactive. Highly reflective core materials, such as an aluminum core in a honeycomb pattern, may guide the luminous output of the LED arrays through the outer skin.

18 Claims, 15 Drawing Sheets

(56) References Cited

U.S. PATENT DOCUMENTS

2016/0350049 A1* 12/2016 Barnidge .............. G06F 3/1423
2018/0182314 A1*  6/2018 Staton ................... A61G 11/00
2018/0273178 A1*  9/2018 Ibrahim ................ B64D 25/00

* cited by examiner

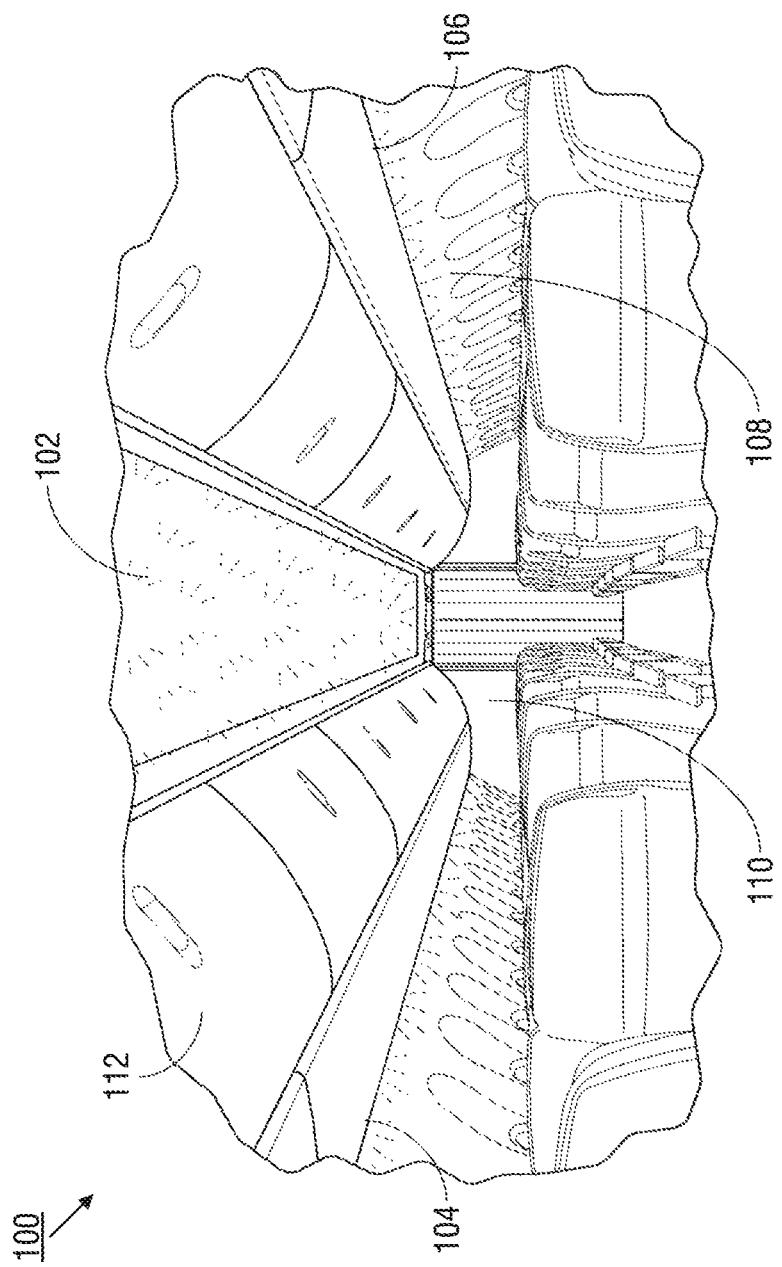

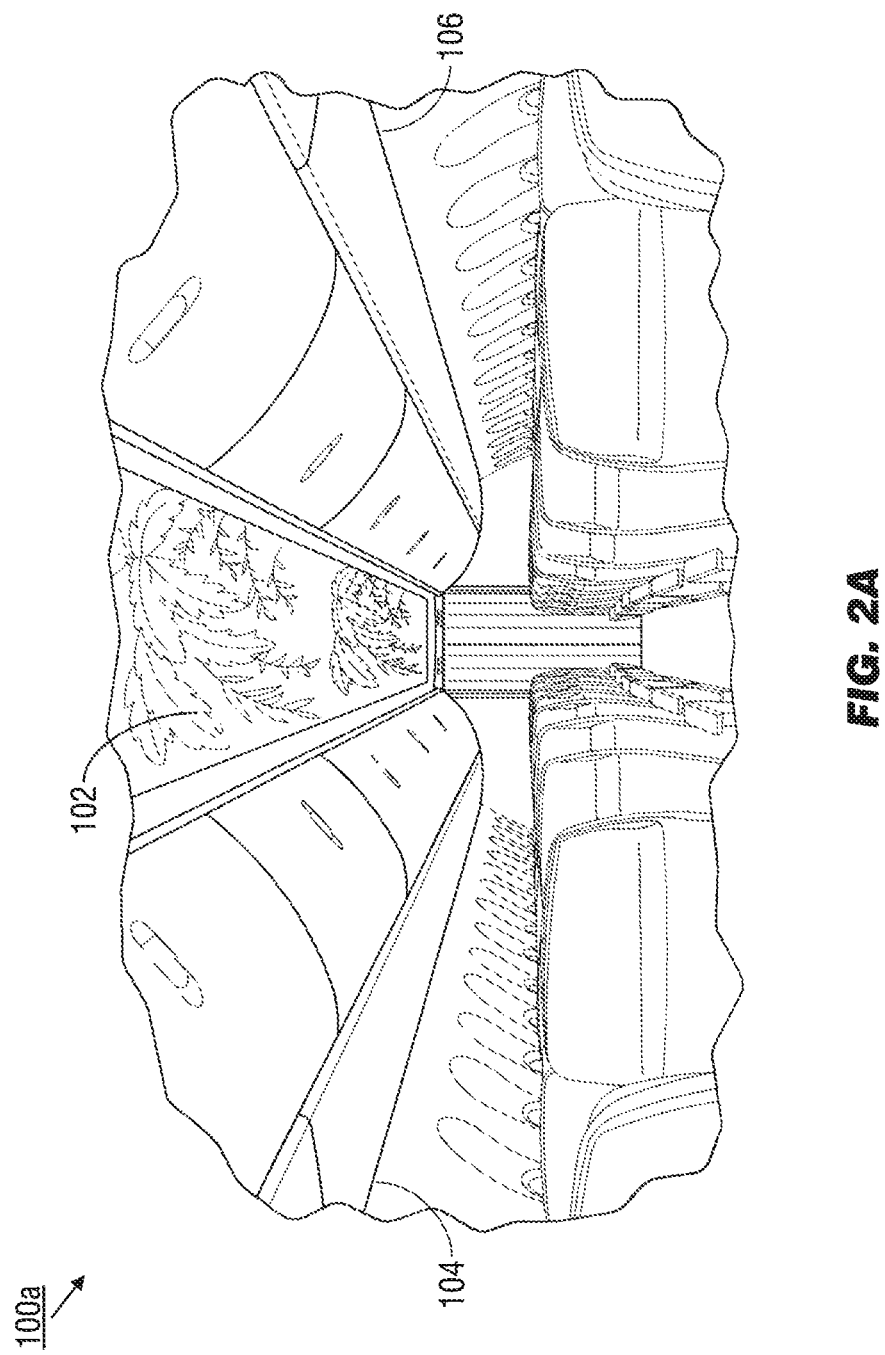

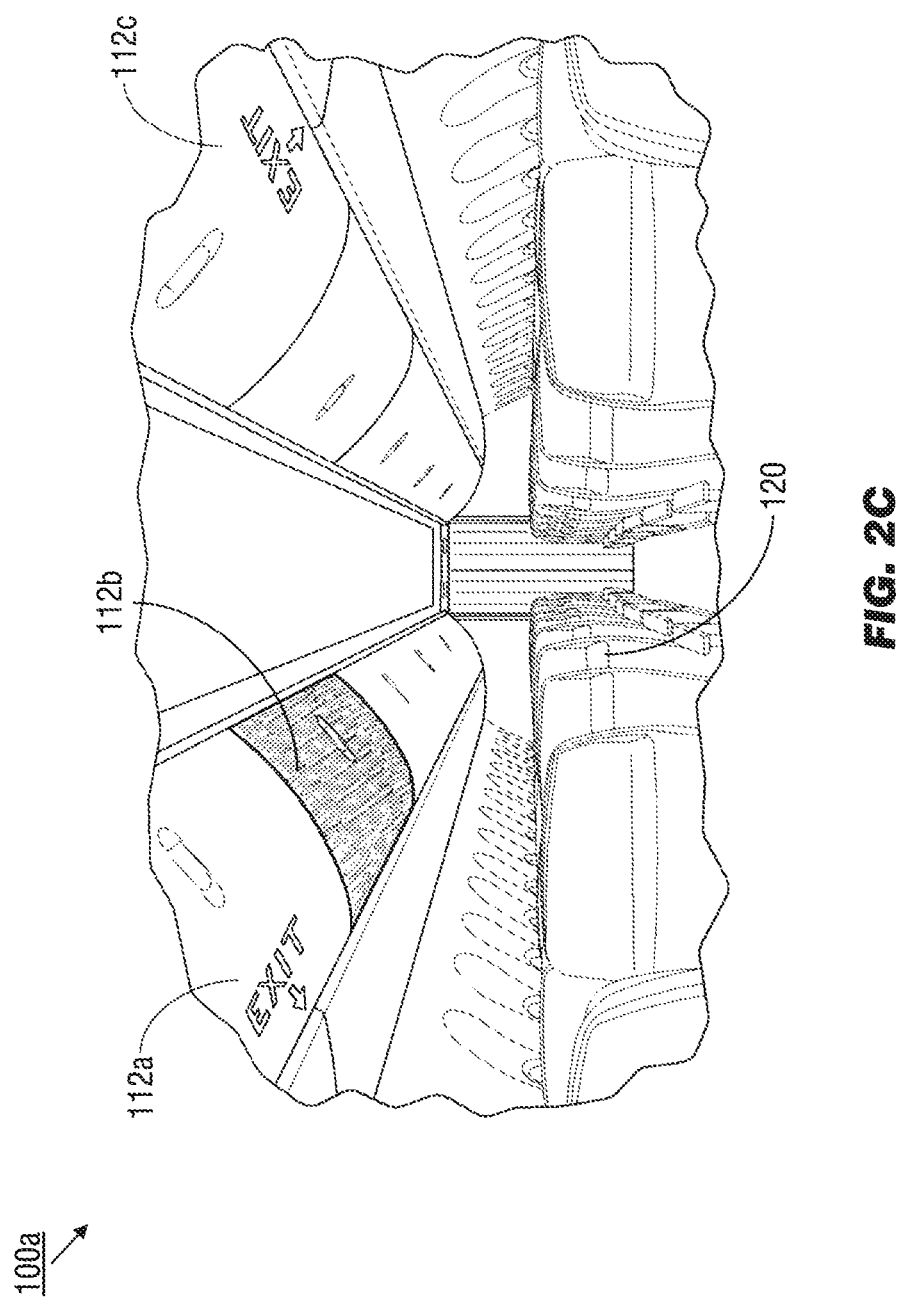

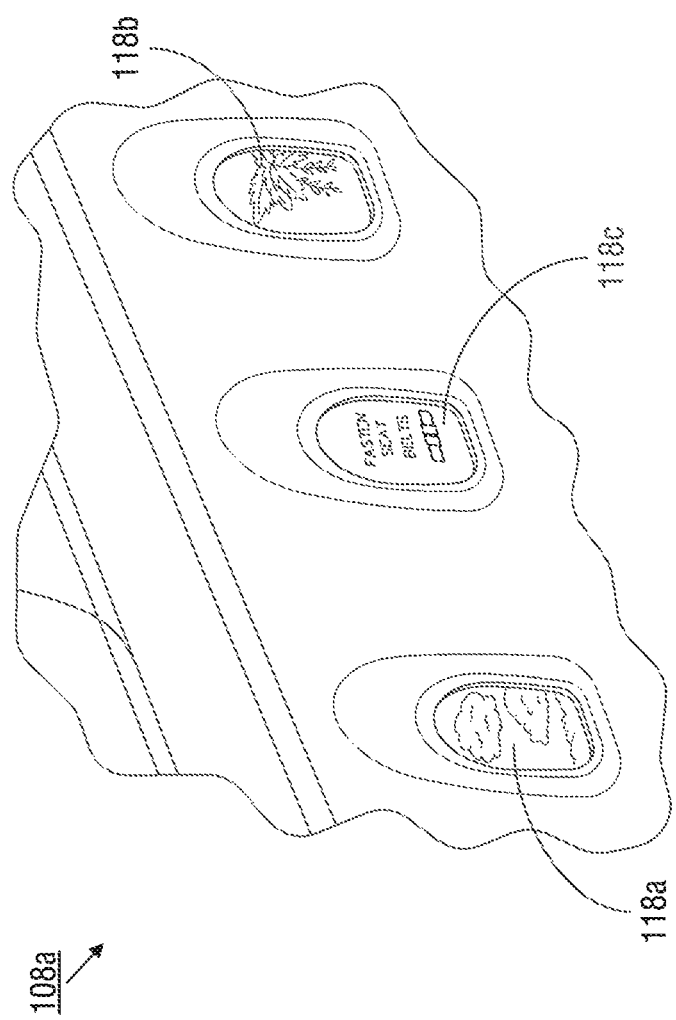

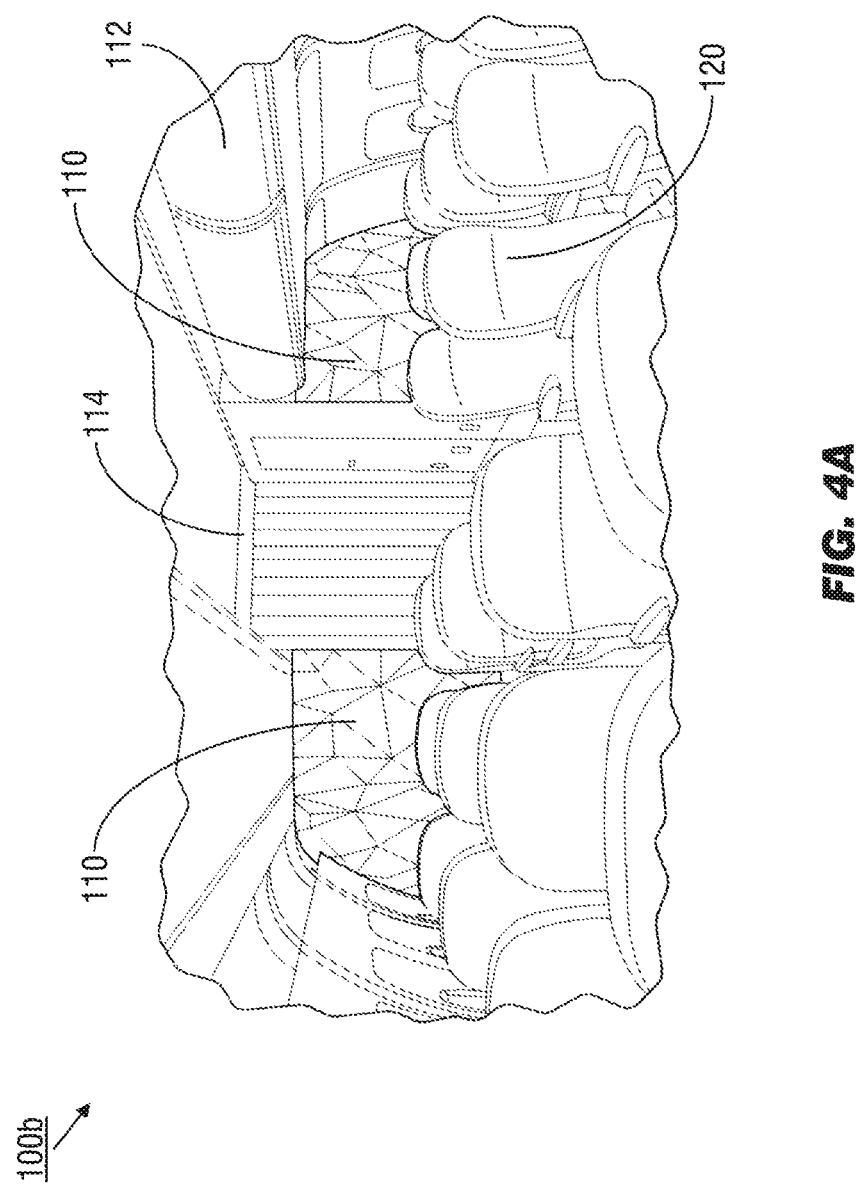

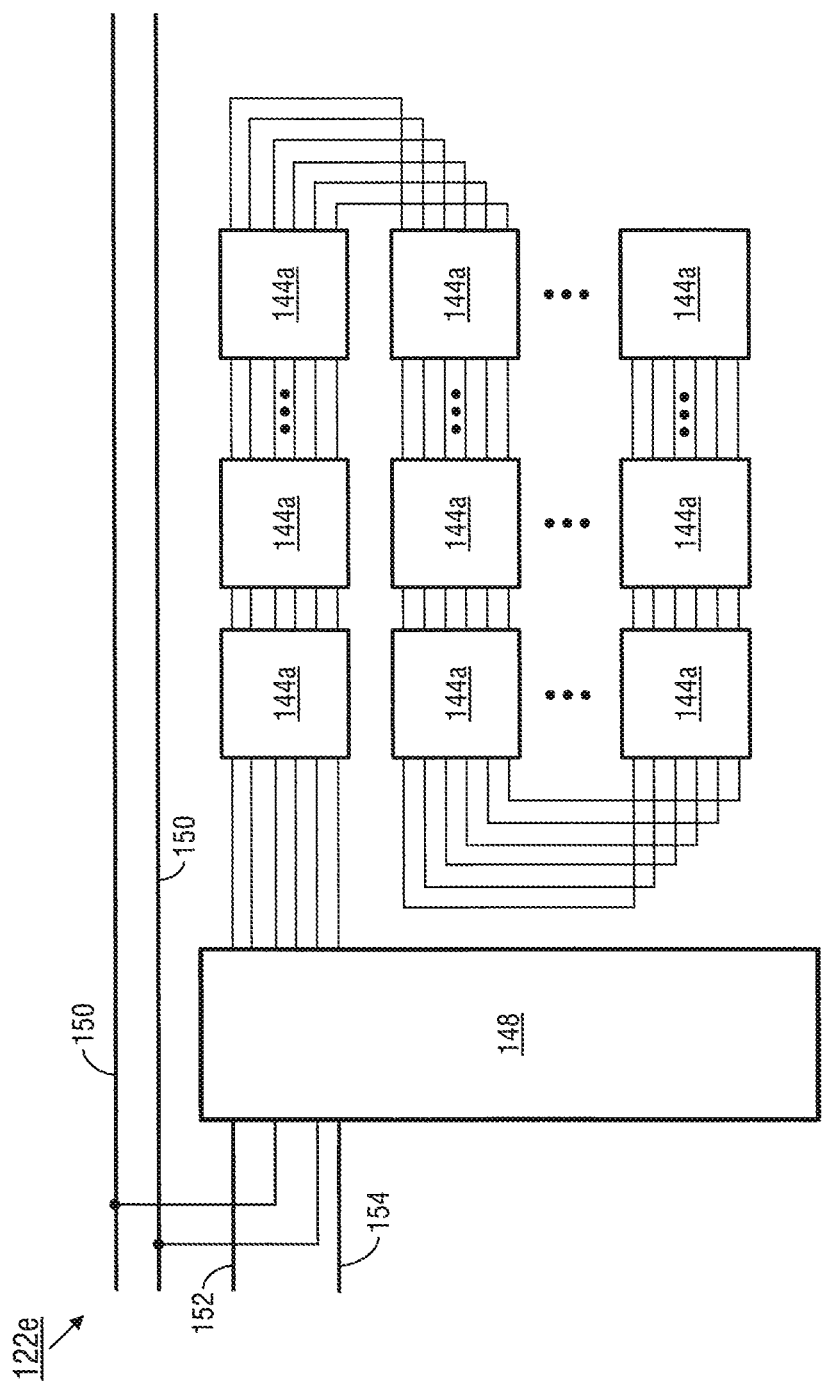

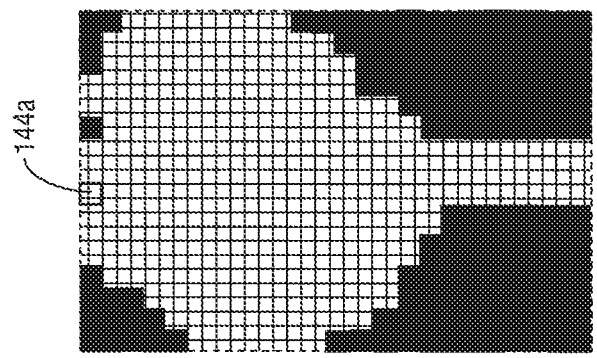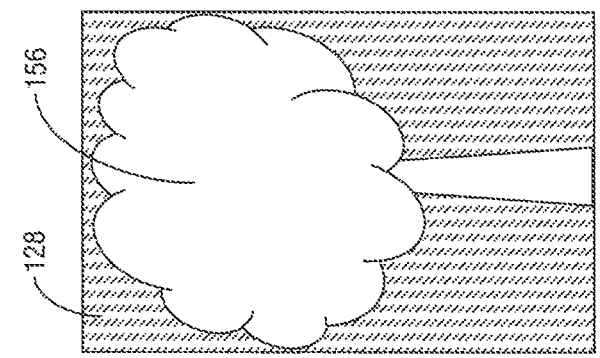
FIG. 8

INTEGRATED MICRO-LED LUMINOUS AIRCRAFT PANEL

CROSS-REFERENCE TO RELATED APPLICATIONS

The present application claims priority under 35 U.S.C. § 120 as a continuation-in-part of co-pending U.S. patent application Ser. No. 15/950,032, filed Apr. 10, 2018, entitled INTEGRATED MICRO-LED LUMINOUS AIRCRAFT PANEL. Said U.S. patent application Ser. No. 15/950,032 is herein incorporated by reference in its entirety.

BACKGROUND

Cabin lighting, signage, and image/video display within conventional passenger aircraft is generally accomplished via separate and distinct systems. Cabin lighting may include fluorescent-based lighting systems and signage (e.g., safety warnings and exit indicators) based around translucent surfaces backlit by individual bulbs. Zone divider bulkheads or monuments may include additional screens for video display (but may provide limited options and allow screens of limited size). Such islanded lighting systems may be relatively high-maintenance (e.g., due to the need to replace or repair individual bulbs), is rarely interactive in any meaningful way (e.g., cabin lighting is rarely adjustable beyond "on", "off", and occasionally "dimmed" states), and adds weight from individual power sources and wiring systems.

SUMMARY

In one aspect, embodiments of the inventive concepts disclosed herein are directed to an integrated aircraft lighting and display panel or system thereof. The panel incorporated high-density arrays of microscopic light-emitting diodes (LED) set into a flexible printed circuit board (PDB) which is contoured to the structural layers of a desired aircraft interior panel (overhead panels, side panels, doorway panels, bin panels, divider panels). Depending on the composition of the LED arrays (white, RGB, white+RGB) the interior panels may serve as an interior cabin lighting system, display safety indicators or directional and emergency signage, and provide high-resolution display of still or streaming images across any interior panel surface within which the LED arrays are embedded. The LED array may simultaneously combine lighting, signage, and display functions as needed. The embedded LED arrays may be covered by transparent or translucent decorative surfaces for diffusing the luminous output of the LED array into a unified whole or providing an outward decorative appearance while the LED arrays are inactive.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1 illustrates an exemplary embodiment of an integrated aircraft lighting and display system according to the inventive concepts disclosed herein;

FIGS. 2A through 2D illustrate operations of the integrated aircraft lighting and display panel system of FIG. 1;

FIGS. 4A and 4B illustrate operations of the integrated aircraft lighting and display panel system of FIG. 1;

FIG. 7 is a diagrammatic illustration of the panel of FIG. 6B;

FIG. 8 is an illustration of the panel of FIG. 6B;

DETAILED DESCRIPTION OF EXEMPLARY EMBODIMENTS

Figure 2B:
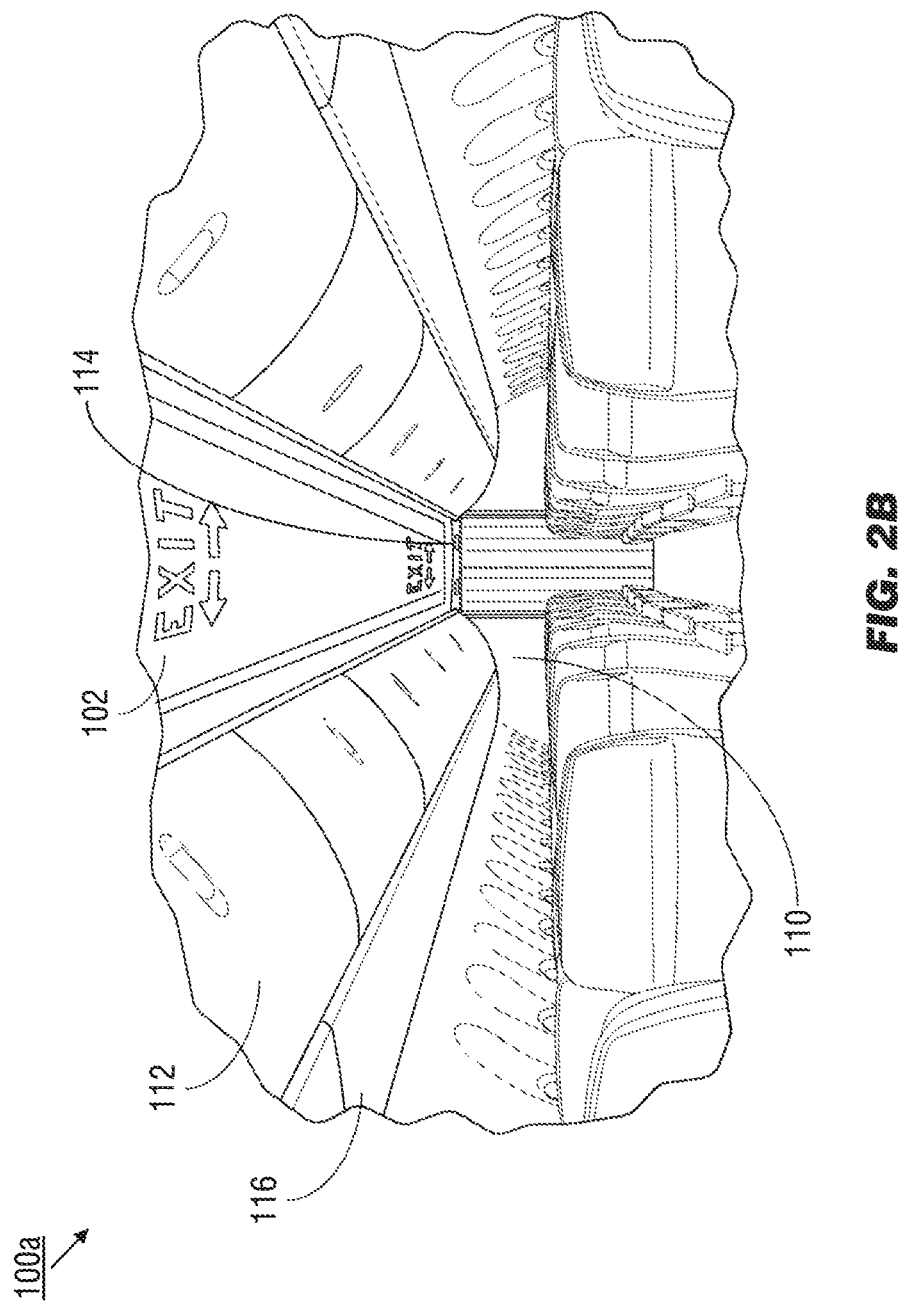

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an integrated aircraft lighting and display system capable of simultaneously providing high-resolution graphic and video display, cabin lighting, and signage across any desired interior surface of the passenger cabin without the bulk and complexity of islanded lighting, signage, and display systems. For example, micro-LED arrays are set into flexible substrates and contoured to overhead panels, side panels, bin panels, doorway panels, or other interior surfaces.

Referring to FIG. 1, an exemplary embodiment of an integrated aircraft lighting and display system 100 may include an integrated overhead lighting and display panel 102 and supplemental lighting and display panels 104, 106. For example, the overhead lighting and display panel 102 may replace conventional aircraft overhead lighting by embedding within an overhead panel a high-density array of light emitting diodes (LED) of microscopic (<1 mm) size (e.g., micro-LED or μLED; chipscale LED). The LED array may incorporate standard or organic LEDs (OLED); quantum dots (qdots; QD) or other like semiconducting nanocrystals; or phosphor-converted LEDs. The integrated aircraft lighting and display system 100 may incorporate μLED arrays contoured to any interior or structural surface of the aircraft cabin, e.g., inner walls 108 or portions thereof; zone divider bulkheads 110 or monuments; and individual compartment or bin panels (112). The integrated aircraft lighting and display system 100 may incorporate white, monochromatic, red/green/blue (RGB), white/RGB, or full-spectrum LEDs in order to provide a broad array of highly modifiable lighting and display options on almost any interior surface. For example, the overhead lighting and display panel 102 may incorporate a diffuser layer over the LED array in order to provide a uniformly illuminated, glare-free surface evocative of, or similar to, natural sky just after sunrise or before sunset. The illuminated surface of the overhead lighting and display panel 102 may be further modifiable or tunable, e.g., according to the time of day or the current flight segment (dimmer for transoceanic flights, brighter during taxi, takeoff and landing (TTL) phases). The output of the supplemental lighting and display panels 104, 106 may be synchronized to match that of the overhead lighting and display panel 102.

Referring to FIGS. 2A through 2D, the integrated aircraft lighting and display system 100a may be implemented and may operate similarly to the integrated aircraft lighting and display system 100 of FIG. 1, except that the overhead lighting and display panel 102 of the integrated aircraft lighting and display system 100a may display high resolution graphics. For example, the use of embedded high-density μLED arrays allows the display output of the supplemental lighting and display panels 104, 106 to be synchronized with that of the overhead lighting and display panel 102, providing "mood lighting" in support of the graphics displayed overhead. Similarly, the integrated aircraft lighting and display system 100a may unify cabin lighting, display, branding, signage, and visual enhancements by employing other interior surfaces to display static aircraft signage. For example, referring in particular to FIG. 2B, the overhead lighting and display panel 102 (as well as the zone divider panels (110), bin panels (112), doorway panels (114), overhead side panels (116), or other interior panels described above) may incorporate LED arrays for displaying, e.g., exit indicators, directional lighting, seatbelt signs, no-smoking signs, or row indicators as well as the high-resolution graphics shown by FIG. 2A.

Referring in particular to FIG. 2C, the bin panels 112a-c may be implemented and may function similarly to the bin panels 112 of FIG. 1, except that the bin panels 112a-b may similarly display signage and warning notices while the bin panels 112c may be individually illuminated, e.g., to indicate that passengers occupying seats (120) in a particular row may deplane first. For example, one or more passengers seated in an aft row may have an especially urgent or short connection they might otherwise miss, were they to wait for all passengers in forward rows to deplane first.

Referring in particular to FIG. 2D, the inner walls 108a may be implemented and may function similarly to the inner walls 108 of FIG. 1, except that the aircraft interior may be a "windowless cabin" wherein the inner walls 108a include, instead of conventional windows, LED-incorporated portions (118a-c) aligned with the aircraft seats (120). The LED-incorporated portions 118a-c may include LED arrays linked to exterior cameras and image sensors (not shown) configured to capture exterior views of the aircraft, which may then be displayed by the LED-incorporated portions (118a-b). The LED-incorporated portions 118c may additionally or alternatively display signage or emergency messages as needed. The captured images may, e.g., be brightened or dimmed for display to reflect the orientation of the sun and create an accurate illusion of sunlight based on the position of each seat 120 or row.

Figure 3A:
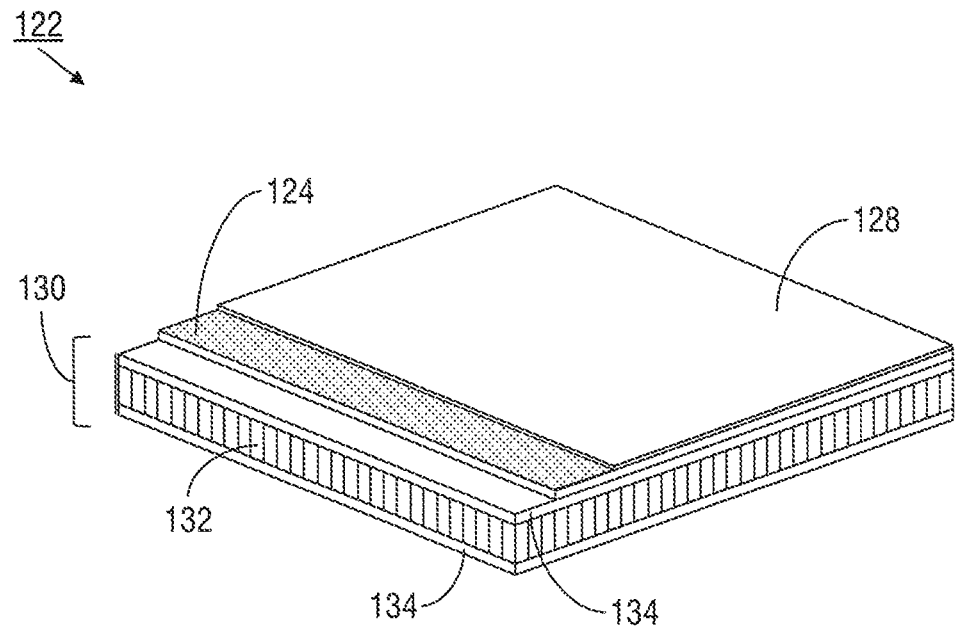
FIGS. 3A and 3B illustrate the structure of individual panels of the integrated aircraft lighting and display panel system of FIG. 1.
Figure 3B:
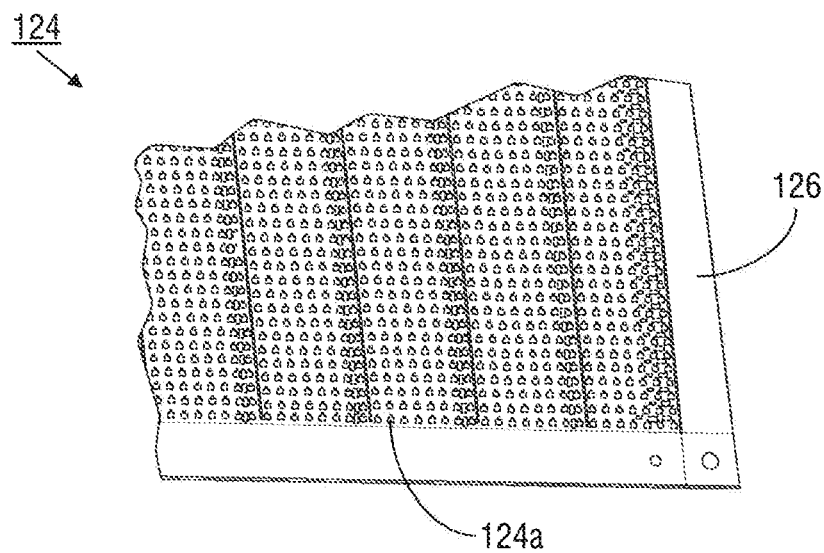

Referring to FIGS. 3A and 3B, an individual panel 122 of the integrated aircraft lighting and display system 100a may include any or all of an overhead lighting and display panel 102 (FIGS. 2A-2D), a supplemental lighting and display panel 104, 106 (FIGS. 2A-2D), an LED-incorporated portion 118 (FIG. 2D) of an inner wall 108a (FIG. 2D), a zone divider bulkhead 110 (FIG. 1), a monument panel; a compartment or bin panel 112a-c (FIG. 2C), a doorway panel 114 (FIG. 2B), or an overhead side panel 116 (FIG. 2B). The individual panel 122 may incorporate a layered structure. For example, the LED array 124 may be a two-dimensional array incorporating a high-density concentration of LEDs or μLEDs (124a) set into a flexible printed circuit board 126 (PCB) or similar appropriate flexible substrate (e.g., Kapon flexible PCB, <0.015 inch FR-4 PCB, any similar thin flexible material including traces applied directly to composite panels). The flexible PCB 126 and LED array 124 may then be sandwiched between one or more translucent or transparent decorative layers (128) and one or more structural layers (130), such that the flexible PCB 126 contours to the shape of the desired aircraft panel.

For example, the decorative layer 128 may include a transparent encapsulant or a diffuser layer for filtering the output of the LED array 124 into the appearance of a uniformly lit surface (see, e.g., FIG. 1). If the integrated aircraft lighting and display system 100*b* will be configured for high-resolution image, video display, or signage functions, the LED array 124 may include exclusively polychromatic (e.g., RGB) µLEDs 124*a*; however, if the integrated aircraft lighting and display system 100*a* will be configured for cabin lighting functions, the LED array 124 may include exclusively white µLEDs (or other monochromatic µLEDs). If the integrated aircraft lighting and display system 100*a* will be configured for multiple functionalities (e.g., able to provide lighting, signage, and display alternatively or simultaneously) the LED array 124 may include a combination of white/monochromatic and RGB/polychromatic µLEDs 124*a*. The structural layers 130 may include any appropriate composite materials (e.g., fiberglass, carbon-fiber) pre-impregnated or pre-contoured to correspond to the desired aircraft panels, e.g., honeycomb-structured composite (132) sandwiched between pre-impregnated composite layers (134). The LED array 124, embedded in the flexible PCB 126, may then be contoured to match the contours of the structural layers 130 and, accordingly, any desired aircraft panel.

Figure 4B:
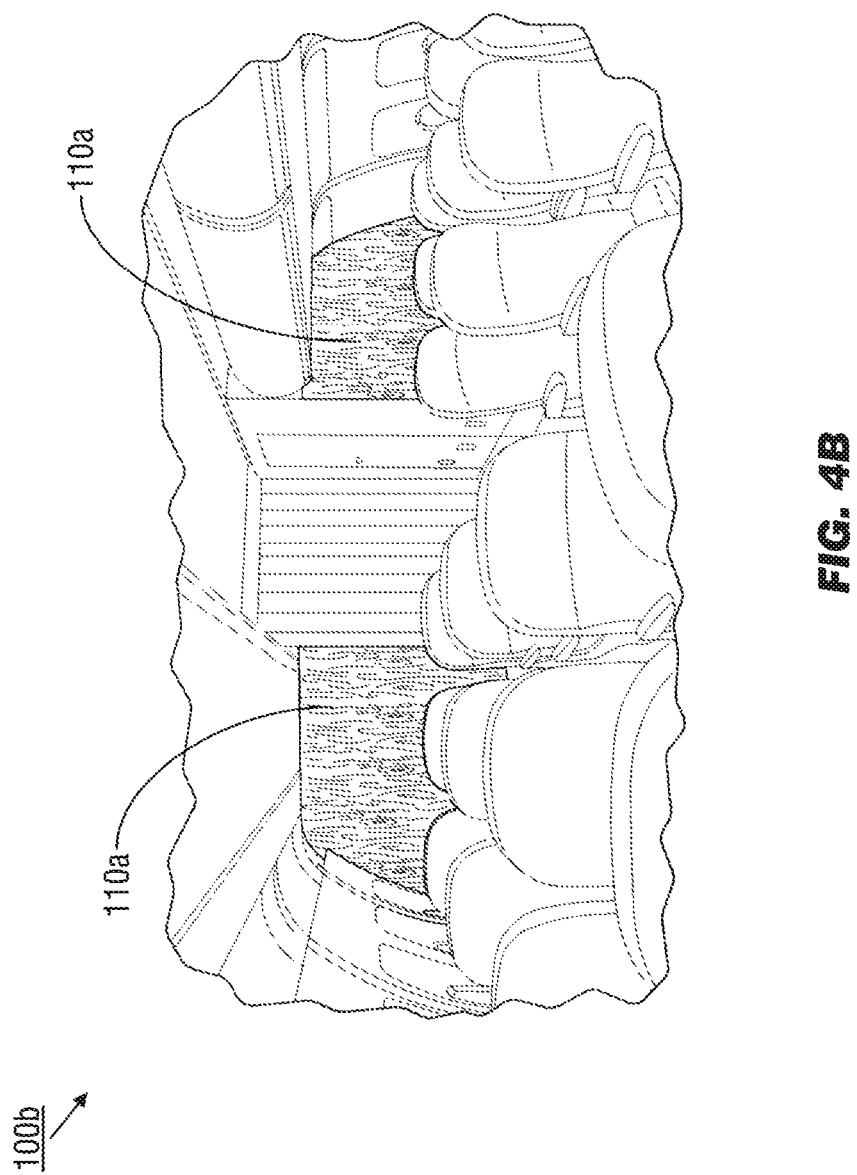

Referring to FIGS. 4A and 4B, the integrated aircraft lighting and display system 100*b* may be implemented and may function similarly to the integrated aircraft lighting and display system 100*a* of FIGS. 2A-2D, except that a zone divider bulkhead 110 (or any other individual panel (122, FIG. 3) or aircraft panel surface described above) may simultaneously provide cabin illumination, signage (e.g., fasten-seat-belt or no-smoking signs), and still/streaming image display (e.g., for decorative, atmospheric, or branding purposes) on a single surface. Similarly, a doorway panel 114 may provide signage (e.g., exit markers) and additional illumination, and a bin panel 112 may be illuminated once the aircraft has landed to indicate, e.g., that passengers in an associated row of aircraft seats 120 may deplane first, or that items may remain within the associated bin.

Referring in particular to FIG. 4B, the zone divider panels 110*a* may be implemented and may function similarly to the zone divider panels 110 of FIG. 4A, except that the decorative layers (128, FIG. 3) of the zone divider panels 110*a* may be fashioned to mimic the outward appearance of other natural, synthetic, or decorative materials (e.g., wood, stone, bamboo, fabric, leather, metal) when the zone divider panels 110*a* are otherwise inactive. When, for example, the zone divider panels 110*a* are activated for the display of high-resolution graphics, lighting, or signage, their appearance may revert to that of the zone divider panels 110 of FIG. 4A.

Figure 5:
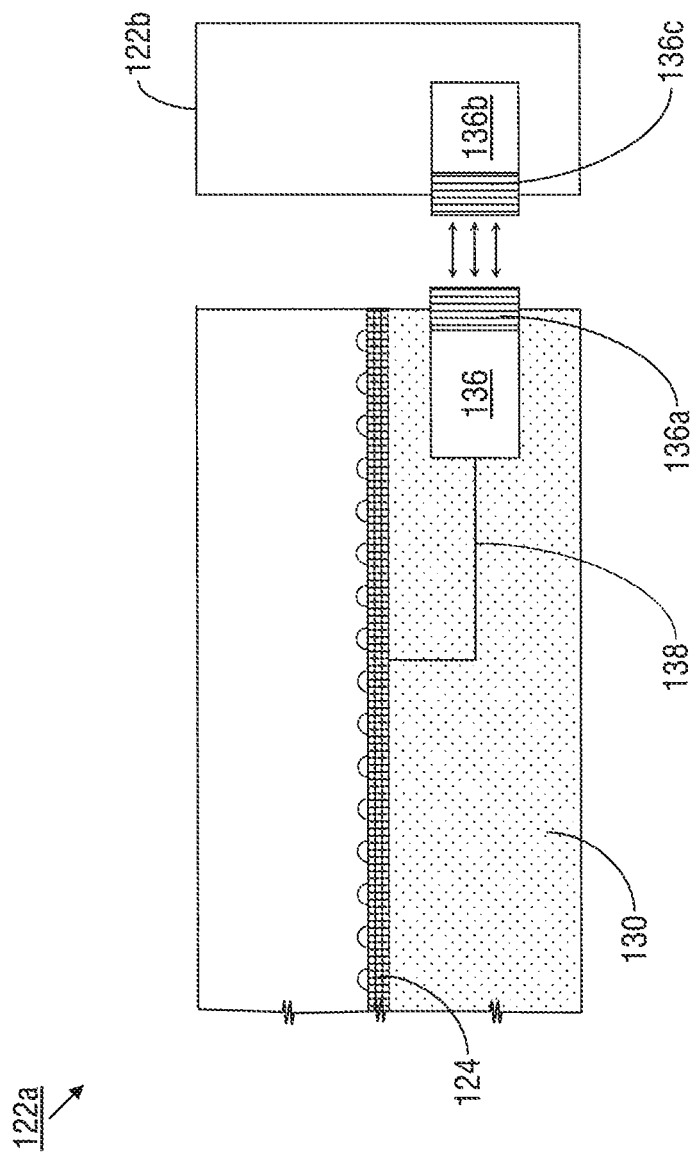
FIG. 5 is a diagrammatic cross-section illustration of the integrated aircraft lighting and display panel system of FIG. 1.

Referring to FIG. 5, the individual panel 122*a* may be implemented and may function similarly to the individual panel 122 of FIG. 3, except that the individual panel 122*a* may incorporate or embed within its structural layers 130 a display controller 136 connected to the LED array 124 by traces (138). The display controller 136 may include processors programmed to independently regulate the display output of the LED array 124 (e.g., based on a time, a flight segment, a temperature, or some other detected condition). The display controller 136 may be connected, physically or wirelessly, to an aircraft controller configured to regulate the output of the individual panel 122*a*, e.g., as part of a group of panels corresponding to a region of the aircraft, or as the controller of the integrated aircraft lighting and display system 100*b* (FIG. 4). The display controller 136 may include a conductive or communicative portion (136*a*) protruding at least partially from the individual panel 122*a*. The individual panel 122*a* may be physically installed proximate to at least one neighboring or adjacent individual panel (122*b*) whose embedded display controller 136*b* similarly includes a communicative portion 136*c*. When multiple individual panels 122*a*-*b* are fitted into place, the corresponding display controllers 136, 136*b* and protruding portions 136*a*, 136*c* may be disposed such that multiple communicative portions 136*a*, 136*c* contact each other and establish a communicative connection between the corresponding display controllers 136, 136*b*. In this way an individual panel 122*a* may coordinate operations with other adjacent individual panels 122*b*, or the individual panel 122*a* may relay control input (e.g., received from an aircraft network controller) to an adjacent individual panel 122*b*.

Figure 6A:
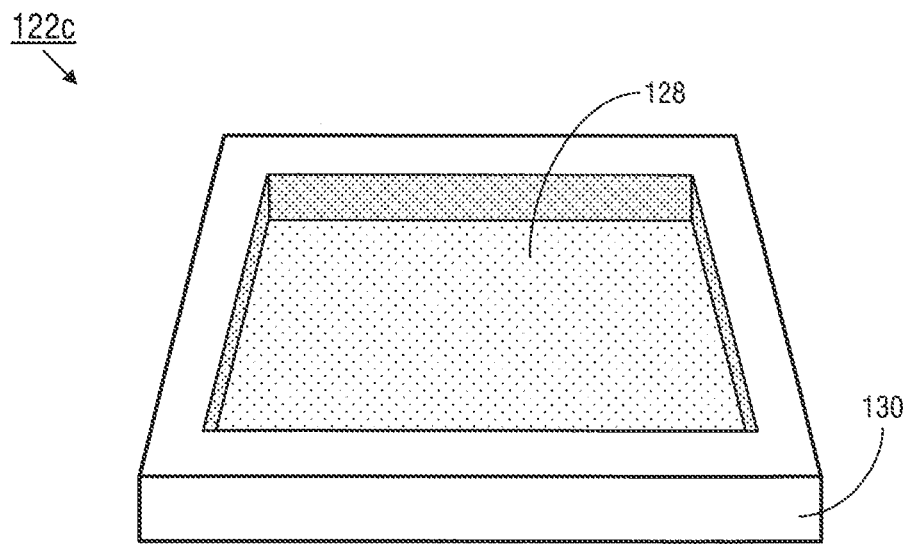
FIGS. 6A and 6B are respectively overhead perspective and profile views of an integrated aircraft lighting and display panel of the system of FIG. 1.
Figure 6B:
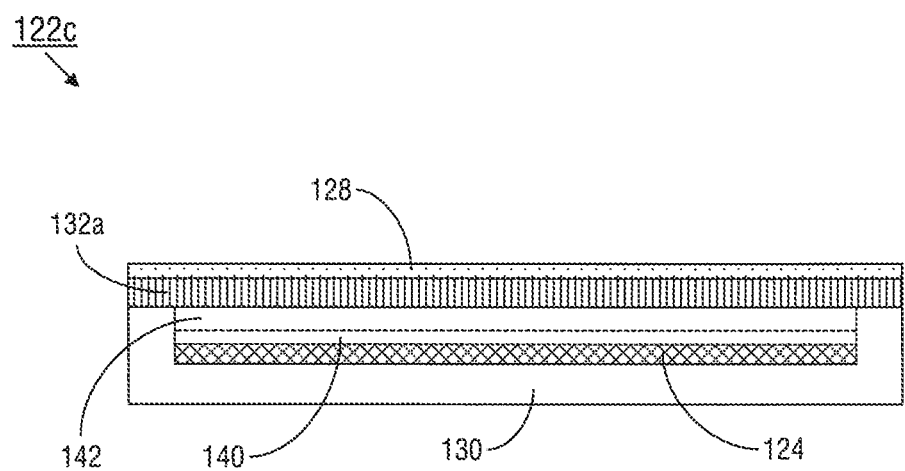

Referring to FIGS. 6A and 6B, the integrated lighting and display panel 122*c* of the of the integrated aircraft lighting and display system 100, 100*a*-*b* may be implemented and may function similarly to the integrated lighting and display panel 122*b* of FIG. 5, except that the integrated lighting and display panel 122*c* may be at least partially embedded in the structural layer 130. The structural layer 130 may include, but is not limited to, foam core or other similar composite materials conformable to interior surfaces of an aircraft as described above (e.g., overhead panels (102, FIG. 1), inner walls (108, FIG. 2B), zone divider panels and bulkheads (110, FIG. 2B), bin panels (112, FIG. 2B), doorway panels (114, FIG. 2B)).

Referring in particular to FIG. 6B, the integrated lighting and display panel 122*c* may incorporate an LED array 124 at least partially covered with a transparent encapsulant 140. In order to conserve weight, an air gap (142) may be left above the encapsulant 140 and the core material layer 132*a*. The core material layer 132*a* may be implemented and may function similarly to the honeycomb-structured composite layer 132 of FIG. 3A, except that the core material layer 132*a* may be disposed so as to provide structural reinforcement and stability to the integrated lighting and display panel 122*c* while supporting the transmission of the luminous output of the LED array 124 to, and through, the outer decorative layers 128 of translucent or transparent material via the columnar cells defined by the core material layer. For example, the core material layer 132*a* may be fashioned of aluminum or any similarly appropriate light, durable material in a honeycomb structure defining a series of hexagonal columnar cells. The core material layer 132*a* may be fashioned such that the columnar cells are hexagonal, square, or any other tessellating polygon or tessellating combination of polygons (e.g., octagonal/square). In some embodiments, the core material layer 132*a* may be fashioned of a laminate or semi-translucent material, such that the hexagonal or polygonal pattern defining the columnar cells is not visible through the outer decorative layer/s 128, e.g., when the LED arrays 124 are deluminated.

Figure 6C:
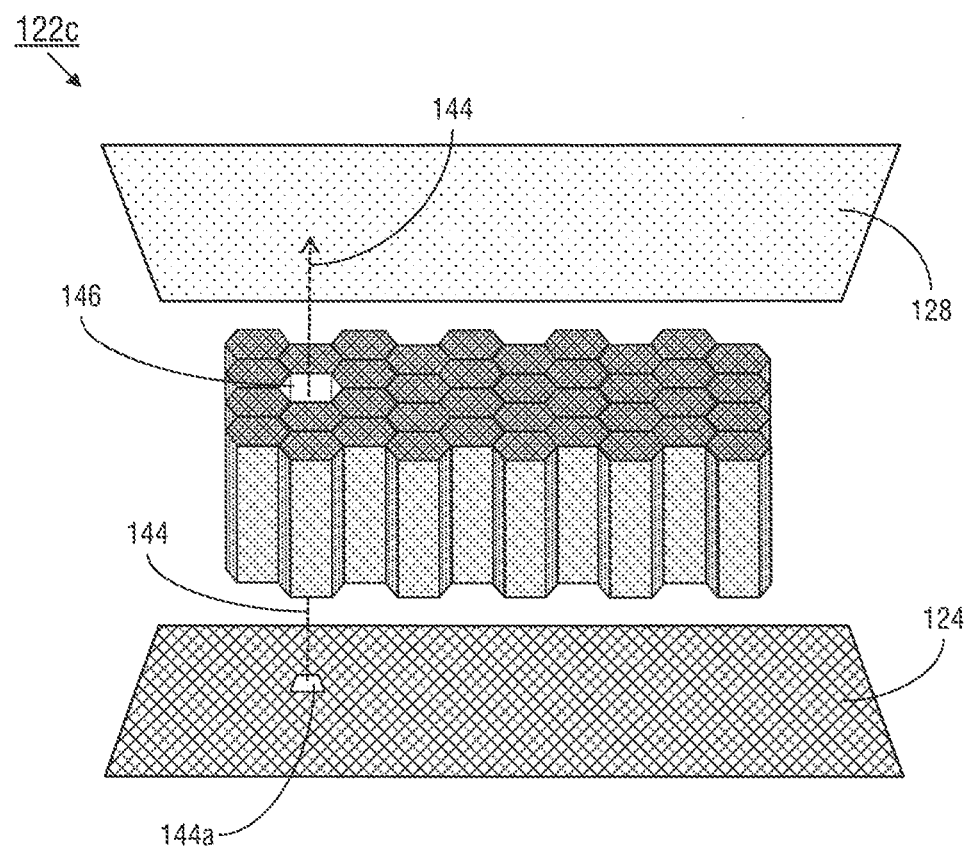
FIG. 6C is an exploded view of the panel of FIG. 6B.

Referring in particular to FIG. 6C, the core material layer 132*a* may be disposed between the LED array 124 and the decorative layer/s 128 such that the luminous output (144) of each LED module (144*a*) of the LED array is transmitted to the decorative layer/s via the columnar cells (146) defined by the core material layer 132*a*. For example, a core material layer 132*a* fashioned of aluminum core may have the added benefits of conductivity and reflectivity, such that, e.g., an optimal portion of the luminous output 144 is reflected by the aluminum sides of the columnar cells 146 and reaches the decorative layer/s 128. Similarly, excess heat generated by the LED modules 144*a* may be conducted to the surface (e.g., the decorative layer/s 128) of the integrated lighting and display panel 122*c* by the core material layer 132*a*.

Figure 6D:
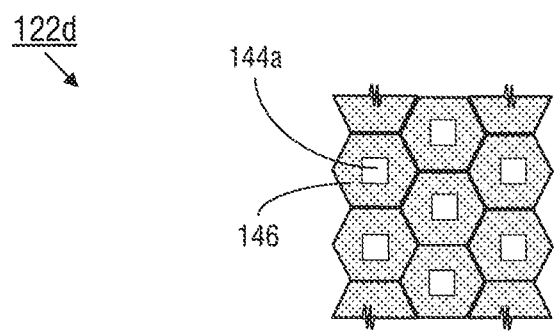
FIG. 6D is an overhead inset view of the panel of FIG. 6B.

Referring in particular to FIG. 6D, the integrated lighting and display panel 122*d* may be implemented and may function similarly to the integrated lighting and display panel 122c, except that the integrated lighting and display panel 122d may position an LED module 144a within each individual columnar cell 146 defined by the core material layer 132a. For example, each LED module 144a may be centered within a columnar cell 146.

Referring to FIG. 7, the integrated lighting and display panel 122e may be implemented and may function similarly to the integrated lighting and display panels 122c-d of FIGS. 6A through 6D, except that the integrated lighting and display panel 122e may incorporate a micro lighting control unit (MLCU) 148 connected to, e.g., aircraft network buses (e.g., RS485, CANBUS) 150, aircraft power supplies 152, and aircraft data interfaces 154 (e.g., Airbus Cabin Intercommunication Data System (CIDS)) from which the MLCU may receive instructions and operating power. The MLCU 148 may be implemented and may operate similarly to the display controllers 136, 136a-b of FIG. 5, except that the MLCU 148 may supply the array (124, FIG. 6A-C) of LED modules 144a distributed throughout the integrated lighting and display panel 122e with power and instructions, e.g., synchronization signals, clock signals, activation instructions). The LED modules 144a may be distributed throughout the integrated lighting and display panel 122e in any appropriate pattern. For example, the LED modules 144a may be distributed so as to provide a uniformly lit surface, e.g., for cabin lighting or image display functions.

Referring to FIG. 8, the integrated lighting and display panel 122f may be implemented and may function similarly to the integrated lighting and display panel 122e of FIG. 7, except that the integrated lighting and display panel 122f may incorporate the placement and arrangement of LED modules 144a to conform to a pattern or design associated with the decorative layer 128. For example, as described above, the decorative layer 128 may be configured to present the appearance of other decorative materials within which one or more ornamental patterns (156), e.g., a tree, may be visible. The integrated lighting and display panel 122f may conserve weight and power by arranging LED modules (144a) only behind those portions of the decorative layer 128 conforming to the ornamental pattern 156, rather than distributing the LED modules throughout the whole of the integrated lighting and display panel 122f.

Figure 9A:
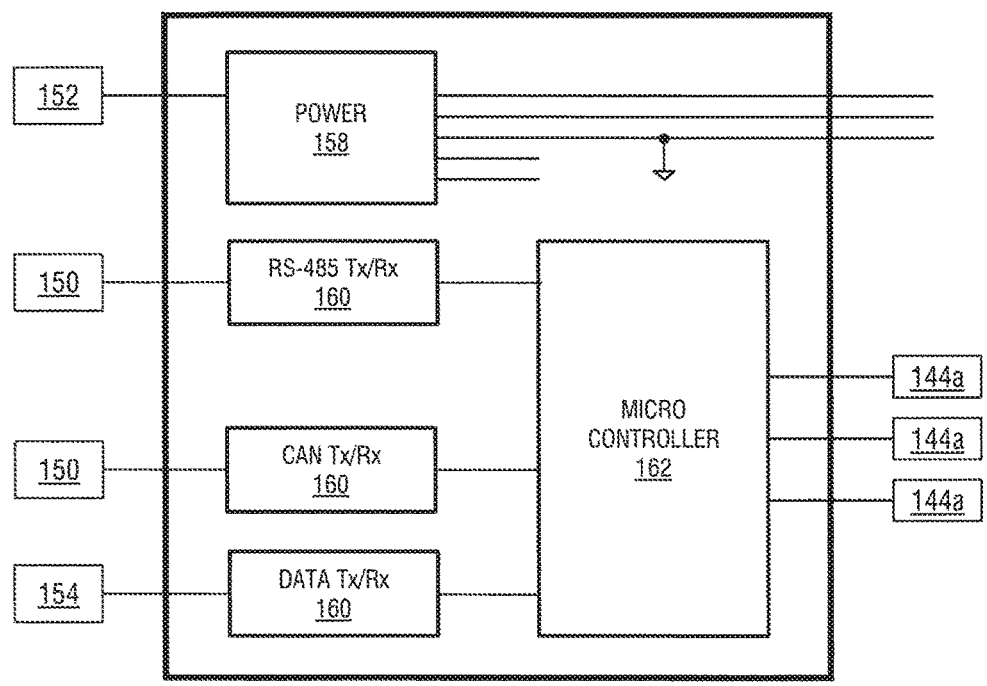
FIG. 9A is a diagrammatic illustration of a lighting control unit (LCU) of the panel of FIG. 7.

Referring to FIG. 9A, the MLCU 148a may be implemented and may function similarly to the MLCU 148 of FIG. 7, except that the MLCU 148a may incorporate a power supply 158, transceivers 160, and a microcontroller 162. The power supply 158 may be connected to the aircraft power supply (152) and supply operating power to the LED modules (140, FIG. 7) within a given integrated lighting and display panel (122f, FIG. 8). The transceivers 160 may provide two-way (transmit/receive) communications between the MLCU 148a and aircraft network buses 150 and data interfaces 154. The microcontroller 162 may relay activation instructions from the transceivers 160 to the individual LED modules 144a.

Figure 9B:
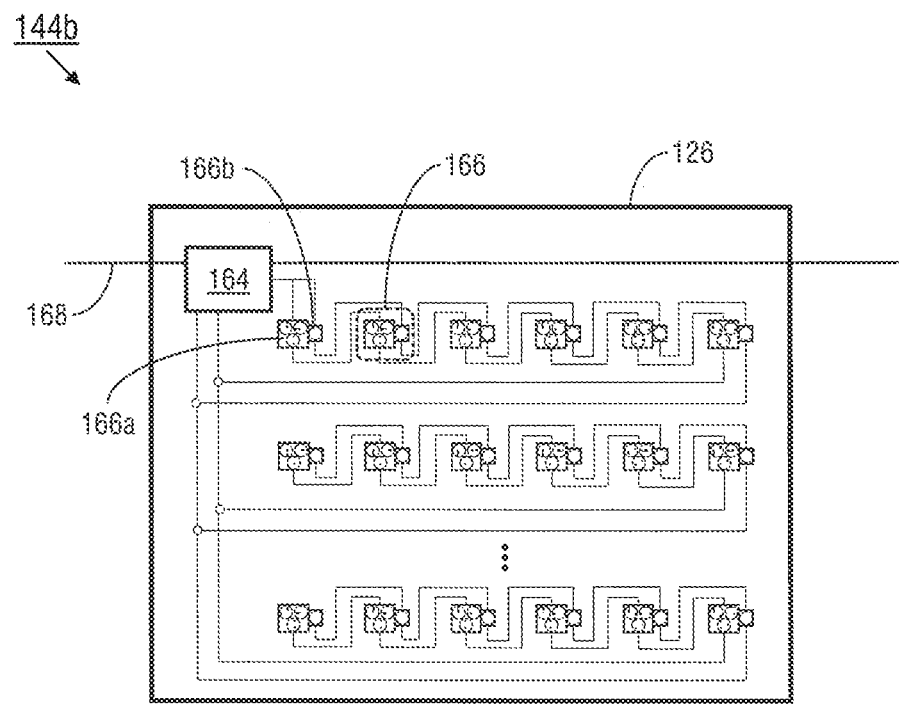
FIGS. 9B and 9C are diagrammatic illustrations of LED modules of the panel of FIG. 7.

Referring to FIG. 9B, the LED module 144b may be implemented and may function similarly to the LED modules 144a of FIGS. 7 and 9A, except that each individual LED module 144b may incorporate a local microcontroller unit 164 (MCU) and an array of LED units 166 mounted to a flexible printed circuit board (PCB) 126. The LED units 166 may be arranged on the PCB 126 as an M×M square array, e.g., a 6×6 square array of 36 LED units connected in sequence, as an M×N rectangular array (wherein M and N are integers), or in any other appropriate pattern of individual LED units (e.g., concentric circles, triangles, 1×M single-unit LED arrays, other polygonal arrays). Each local MCU 164 may be connected to (168) the power supply (158, FIG. 9A) and microcontroller (162, FIG. 9A) of the MLCU (148a, FIG. 9A) for the integrated lighting and display panel (122e, FIG. 7) within which the LED module 140b is disposed. The LED module 144b may thereby receive operating power, synchronization signals, clock signals, data, or operating instructions from the MLCU 148a.

Each LED unit 166 may incorporate an RGB LED (166a) and a white LED (166b) which may be activated or deactivated per instructions received by the local MCU 164. In some embodiments, each individual LED unit 166 of each LED module 144b may be individually addressable, allowing the integrated lighting and display panel 122e to display high-resolution still or streaming images.

Figure 9C:
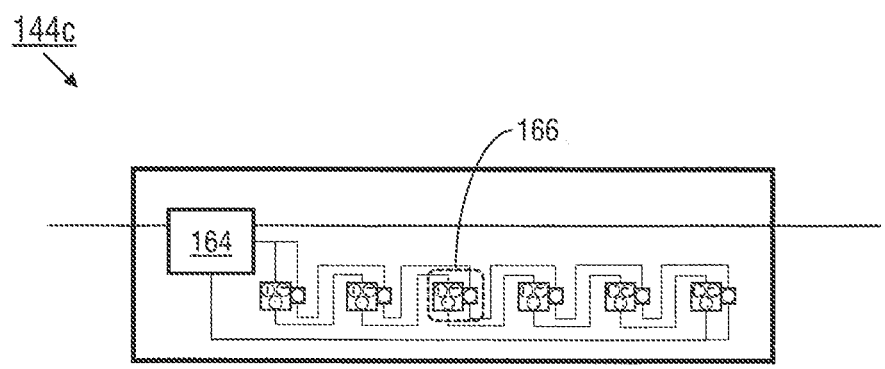

Referring to FIG. 9C, the LED module 144c may be implemented and may function similarly to the LED module 144b of FIG. 9B, except that the LED module 144c may be an LED strip incorporating a 1×M linear array of LED units 166. In some embodiments, the LED module 144c may be incorporated into a thin flexible LED strip wherein each LED module 144c may correspond to an addressable segment, or wherein each LED unit 166 is individually addressable.

Integrated lighting and display systems according to the inventive concepts herein enhance display functionality within the passenger cabin while reducing weight, complexity, and cost. Almost any desired interior paneled surface within the passenger cabin can be adapted with LED arrays designed for cabin lighting, emergency signage, high-resolution image and video display, or any combination of the three.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An integrated aircraft lighting and display panel, comprising:
   at least one flexible substrate configured to conform to an interior panel of an aircraft;
   at least one lighting control unit (LCU) coupled to at least one of a power source of the aircraft, a network bus of the aircraft, and a data interface of the aircraft;
   a plurality of light-emitting diode (LED) modules disposed on the flexible substrate in a spaced apart relationship and coupled to the LCU, each LED module comprising:
   a) a printed circuit board (PCB);
   b) at least one microcontroller attached to the PCB and coupled to the LCU;
   and
   c) an LED array of one or more LED units arranged on the PCB in a spaced apart relationship, each LED unit coupled to the microcontroller and including at least one of a white LED and a red/green/blue (RGB) LED, the LED array configured to generate a luminous output when activated by the microcontroller;
   at least one decorative layer defining an external surface of the lighting and display panel;
   and a core material separating the flexible substrate and the plurality of LED modules from the decorative layer, the core material capable of at least partially transmitting the luminous output to the decorative layer.

2. The integrated aircraft lighting and display panel of claim 1, wherein each of the one or more LED units include at least one of an organic LED (OLED), a quantum dot, and a phosphor-converted LED.

3. The integrated aircraft lighting and display panel of claim 1, wherein the interior panel includes at least one of an overhead panel, a monument panel, a zone divider panel, a compartment panel, a cabin wall, and a bin panel.

4. The integrated aircraft lighting and display panel of claim 1, wherein the interior panel is associated with at least one of a cabin lighting system of the aircraft and a passenger light corresponding to a seat of the aircraft.

5. The integrated aircraft lighting and display panel of claim 1, wherein the interior panel is associated with a cabin signage system of the aircraft.

6. The integrated aircraft lighting and display panel of claim 1, wherein the interior panel is associated with a display system of the aircraft and the luminous output corresponds to at least one of a static image and a sequence of streaming images displayed by the display system.

7. The integrated aircraft lighting and display panel of claim 6, wherein the plurality of LED modules is communicatively coupled to at least one camera configured to capture the at least one of a static image and a sequence of streaming images.

8. The integrated aircraft lighting and display panel of claim 7, wherein at least one of the static image and the sequence of streaming images is associated with a perspective external to the aircraft.

9. The integrated aircraft lighting and display panel of claim 1, wherein the decorative layer includes at least one diffusion layer configured to diffuse the luminous output.

10. The integrated aircraft lighting and display panel of claim 1, wherein the decorative layer includes at least one of a transparent layer and a translucent layer.

11. The integrated aircraft lighting and display panel of claim 1, wherein the decorative layer is configured to mimic at least one of a decorative material and a natural material.

12. The integrated aircraft lighting and display panel of claim 11, wherein the at least one of a decorative material and a natural material includes at least one of wood, stone, leather, fabric, metal, and bamboo.

13. The integrated aircraft lighting and display panel of claim 1, wherein one or more of the LED arrays include at least one of:
 1) an LED strip comprising the one or more LED units sequentially arranged;
 and
 2) an LED tile comprising an X by Y array of the one or more LED units, wherein X and Y are integers.

14. The integrated aircraft lighting and display panel of claim 1, wherein each of the one or more LED units is individually addressable by the LCU.

15. The integrated aircraft lighting and display panel of claim 1, wherein the core material includes at least one of a reflective material, a conductive material, a translucent material, and a metallic material.

16. The integrated aircraft lighting and display panel of claim 1, wherein the core material is configured to define a plurality of columnar cells, each columnar cell partially filled with one or more of a transparent encapsulant and an air gap.

17. The integrated aircraft lighting and display panel of claim 16, wherein the plurality of columnar cells is defined by at least one of a tiling pattern and a polygonal pattern.

18. The integrated aircraft lighting and display panel of claim 16, wherein each of the one or more LED units corresponds to a columnar cell of the plurality of columnar cells.

* * * * *